United States Patent
Ouellette et al.

(10) Patent No.: US 12,026,686 B2
(45) Date of Patent: Jul. 2, 2024

(54) SYSTEMS AND METHODS FOR FACILITATING PAYMENT SERVICE-BASED CHECKOUT WITH A MERCHANT

(71) Applicant: JPMORGAN CHASE BANK, N.A., New York, NY (US)

(72) Inventors: Scott H. Ouellette, Kingston, NH (US); Mark W. Robinson, Frisco, TX (US); Winter P. Ng, Lutz, FL (US); Ryan Evans, Prosper, TX (US); Sudharsan Selvakumar, Irving, TX (US); Tharakesh Rangaswamy, Frisco, TX (US); Rajitha Dissanayake, Frisco, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 181 days.

(21) Appl. No.: 16/925,103

(22) Filed: Jul. 9, 2020

(65) Prior Publication Data
US 2022/0012701 A1    Jan. 13, 2022

Related U.S. Application Data

(60) Provisional application No. 62/872,406, filed on Jul. 10, 2019.

(51) Int. Cl.
*G06Q 20/08* (2012.01)
*G06Q 20/02* (2012.01)
*G06Q 20/36* (2012.01)

(52) U.S. Cl.
CPC ....... *G06Q 20/0855* (2013.01); *G06Q 20/027* (2013.01); *G06Q 20/3674* (2013.01)

(58) Field of Classification Search
CPC ............. G06Q 20/0855; G06Q 20/027; G06Q 20/3674
See application file for complete search history.

(56) References Cited

U.S. PATENT DOCUMENTS 10,290,003 B1 * 5/2019 Hammad ............. G06Q 20/425
11,276,049 B2 * 3/2022 Annamalai ......... H04W 12/068
(Continued)

FOREIGN PATENT DOCUMENTS

KR    20180008592 A  *  1/2018

OTHER PUBLICATIONS

"A Formal Model of an Electronic Commerce System", Kris Hiebert, University of Manitoba, Department of Computer Science, 2004 (Year: 2004).*

*Primary Examiner* — Duan Zhang
(74) *Attorney, Agent, or Firm* — GREENBERG TRAURIG LLP

(57) ABSTRACT

Systems and methods for facilitating payment service-based guest checkout with a merchant are disclosed. According to one embodiment, a method for facilitating payment service-based guest checkout with a merchant may include: (1) receiving, from a merchant's application or website, a redirect of an online interaction between the merchant and a customer; (2) retrieving, from an issuer payment service, wallet information comprising a plurality of payment options for the customer; (3) receiving a selection of one of the payment options; (4) communicating the selection of the payment option to the payment service for the issuer. The issuer payment service provides a session identifier to the merchant application website, the merchant application or website provides transaction information and the session identifier to a merchant payment host, the merchant payment host retrieves the selected payment option from the issuer payment service and conducts the transaction using the selected payment option.

11 Claims, 2 Drawing Sheets

(56) References Cited

U.S. PATENT DOCUMENTS

| | | | |
|---|---|---|---|
| 2014/0040131 A1* | 2/2014 | Andrews | G06Q 20/3572 |
| | | | 705/44 |
| 2015/0066765 A1* | 3/2015 | Banks | G06Q 20/425 |
| | | | 705/44 |
| 2018/0253705 A1* | 9/2018 | Spector | G06Q 20/102 |
| 2018/0268399 A1* | 9/2018 | Spector | G06Q 20/202 |
| 2019/0385164 A1* | 12/2019 | Royyuru | G06Q 20/36 |

* cited by examiner

SYSTEMS AND METHODS FOR FACILITATING PAYMENT SERVICE-BASED CHECKOUT WITH A MERCHANT

RELATED APPLICATIONS

This application claims priority to, and the benefit of, U.S. Provisional Patent Application Ser. No. 62/872,406, filed Jul. 10, 2019, the disclosure of which is hereby incorporated, by reference, in its entirety.

BACKGROUND OF THE INVENTION

1. Field of the Invention

Embodiments are generally related to systems and methods for facilitating payment service-based guest checkout with a merchant.

2. Description of the Related Art

Merchants often provide a guest checkout option that lets an on-line or app-based shopper make a purchase without having to log in to an account that the shopper has with the merchant. If the customer tries to pay with a credit card issuer's payment service, such as ChasePay, the issuer cannot rely on the merchant to authenticate the consumer. Instead, the payment service will need to authenticate the consumer, retrieve the consumer's payment options, allow the consumer to make their payment decision and ultimately provide payment data back to the merchant (either directly or indirectly).

SUMMARY OF THE INVENTION

Systems and methods for facilitating payment service-based guest checkout with a merchant are disclosed. According to one embodiment, in an information processing apparatus comprising at least one computer processor, a method for facilitating payment service-based guest checkout with a merchant may include: (1) receiving, from a merchant's application or website, a redirect of an online interaction between the merchant and a customer; (2) retrieving, from an issuer payment service, wallet information comprising a plurality of payment options for the customer; (3) receiving a selection of one of the payment options; (4) communicating the selection of the payment option to the payment service for the issuer. The issuer payment service provides a session identifier to the merchant application website, the merchant application or website provides transaction information and the session identifier to a merchant payment host, the merchant payment host retrieves the selected payment option from the issuer payment service and conducts the transaction using the selected payment option.

In one embodiment, the merchant application or website may be executed by the information processing apparatus.

In one embodiment, the method may further include authenticating the customer.

In one embodiment, the payment options may include a credit account, a debit account, a reward point account, etc.

According to another embodiment, in an issuer payment service comprising at least one computer processor, a method for facilitating payment service-based guest checkout with a merchant may include: (1) receiving, from an issuer application or website executed on a customer electronic device, a request for wallet information for a customer, the issuer application or website involved in a redirected online interaction with the customer from a merchant application or website; (2) retrieving the wallet information for the customer; (3) communicating the wallet information to the issuer application or website; (4) receiving a selection of a payment option from the issuer application or website; (5) communicating a session identifier to the merchant application or website; (6) receiving, from a merchant payment host for the merchant, the session identifier and a request for the selected payment option; and (7) communicating the selected payment option to the merchant payment host. The merchant payment host may execute a transaction with the customer using the selected payment option.

In one embodiment, the merchant application or website may be executed by the customer electronic device.

In one embodiment, the customer may be authenticated by the issuer application or website.

In one embodiment, the payment options may include a credit account, a debit account, a reward points account, etc.

According to another embodiment, a system for facilitating payment service-based guest checkout with a merchant may include: an issuer information processing apparatus comprising at least one computer processor executing an issuer's payment application or website and an issuer payment service and a merchant information processing apparatus comprising at least one computer processor executing a merchant's application or hosting a merchant website, and a merchant payment host. The merchant application or website may receive an identification of a good or service to purchase in an online interaction with a customer, may receive a selection of a payment service associated with an issuer of a financial instrument; and may redirect the online interaction to the issuer payment application or website. The issuer payment application or website may retrieve wallet information comprising a plurality of payment options for the customer from the issuer payment service. The issuer payment application or website may receive a selection of one of the payment options and provides the selection to the issuer payment service, and may provide the session identifier to the merchant application or website. The merchant application or website may provide transaction information for the identified good or service to the merchant payment host. The merchant payment host may retrieve the selected payment option from the issuer payment service using the session ID and may conduct the transaction using the selected payment option.

In one embodiment, the customer may be authenticated by the issuer application or website.

In one embodiment, the payment options may include a credit account, a debit account, a reward points account, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments generally relate to systems and methods for facilitating payment service-based guest checkout with a merchant. In embodiments, the customer may shop at a merchant using a merchant app, and may pay using a financial institution app or website; in other embodiments, the customer may shop at the merchant's website and may pay using the financial institution app or website.

Figure 1:
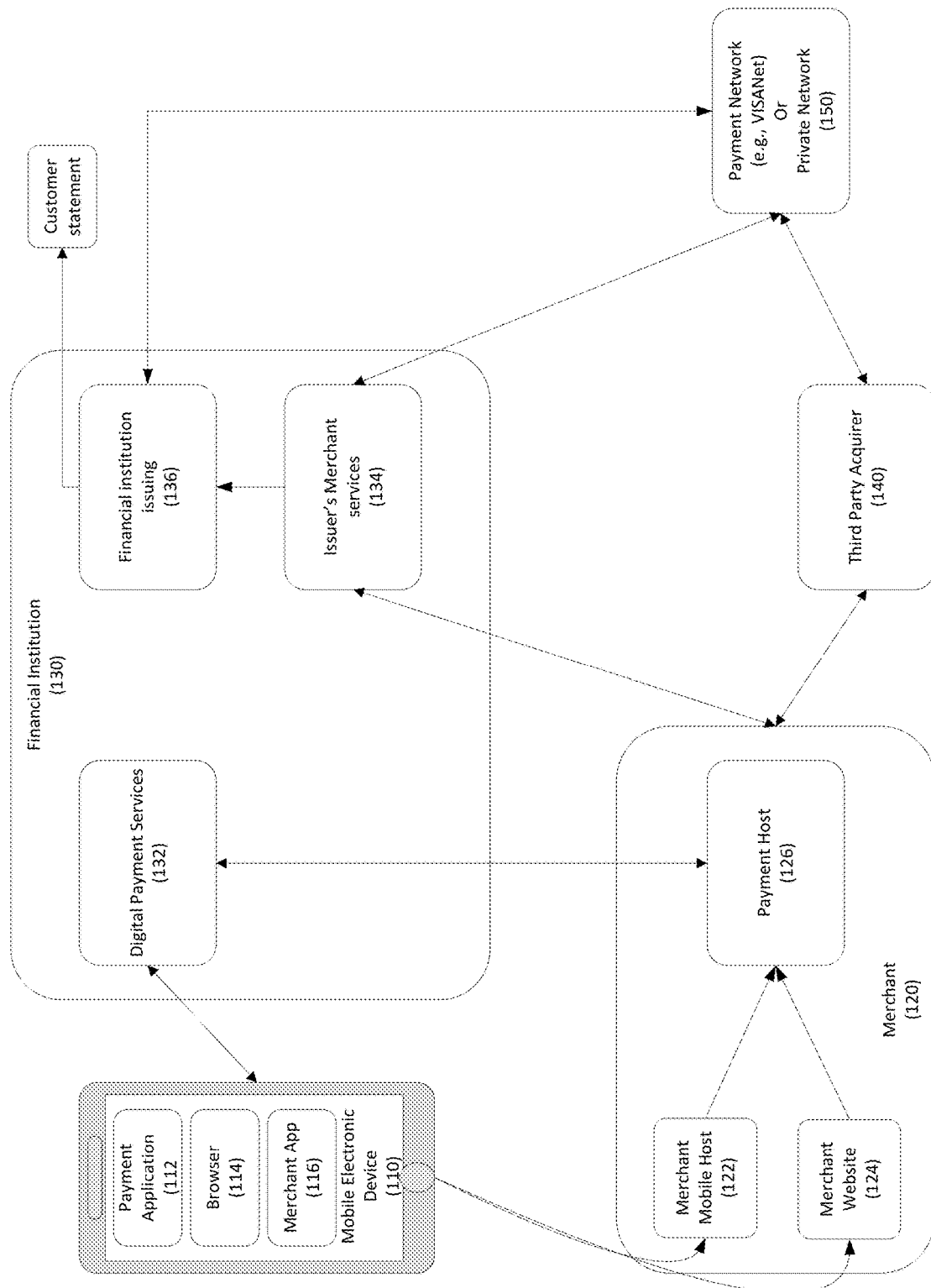
FIG. 1 depicts a system for facilitating payment service-based guest checkout with a merchant according to one embodiment.

Referring to FIG. 1, a system for facilitating payment service-based guest checkout with a merchant are disclosed according to embodiments, respectively. System 100 may include electronic device 110 that may execute a payment application 112, web browser 114, and/or merchant app 116. Browser 114 may browse to a website hosted by merchant 120 by merchant website 124, and merchant app 116 may interact with merchant mobile host 122.

Electronic device 110 may be any suitable electronic device, including smartphones, computers (e.g., desktop, notebook, tablet, etc.), Internet of Things (IoT) appliances, etc.

Financial institution 130 may provide digital payment services 132, merchant services 134, and issuing 136. Digital payment services 132 may interface with payment application 112 and merchant payment host 126. Digital payment services 132 may authenticate the customer and may retrieve electronic wallet information. Digital payment services 132 may also provide a payment information profile for the customer to merchant payment host 126.

Merchant services 134 may act as a merchant acquirer for merchant 120. Financial institution issuing 136 may issue a customer statement or notification with the merchant charged amount at the conclusion of a transaction. For example, the statement may be provided at the close of a statement period; in another embodiment, a notification, such as a push notification, a text message, an email, etc., may be provided.

Issuer's merchant services 134 and third-party acquirer 140 may communicate with payment network 150, such as VisaNet, a private payment network, etc.

Merchant services 134 and third-party acquirer 140 may provide authorization and settlement services for a transaction.

Figure 2:
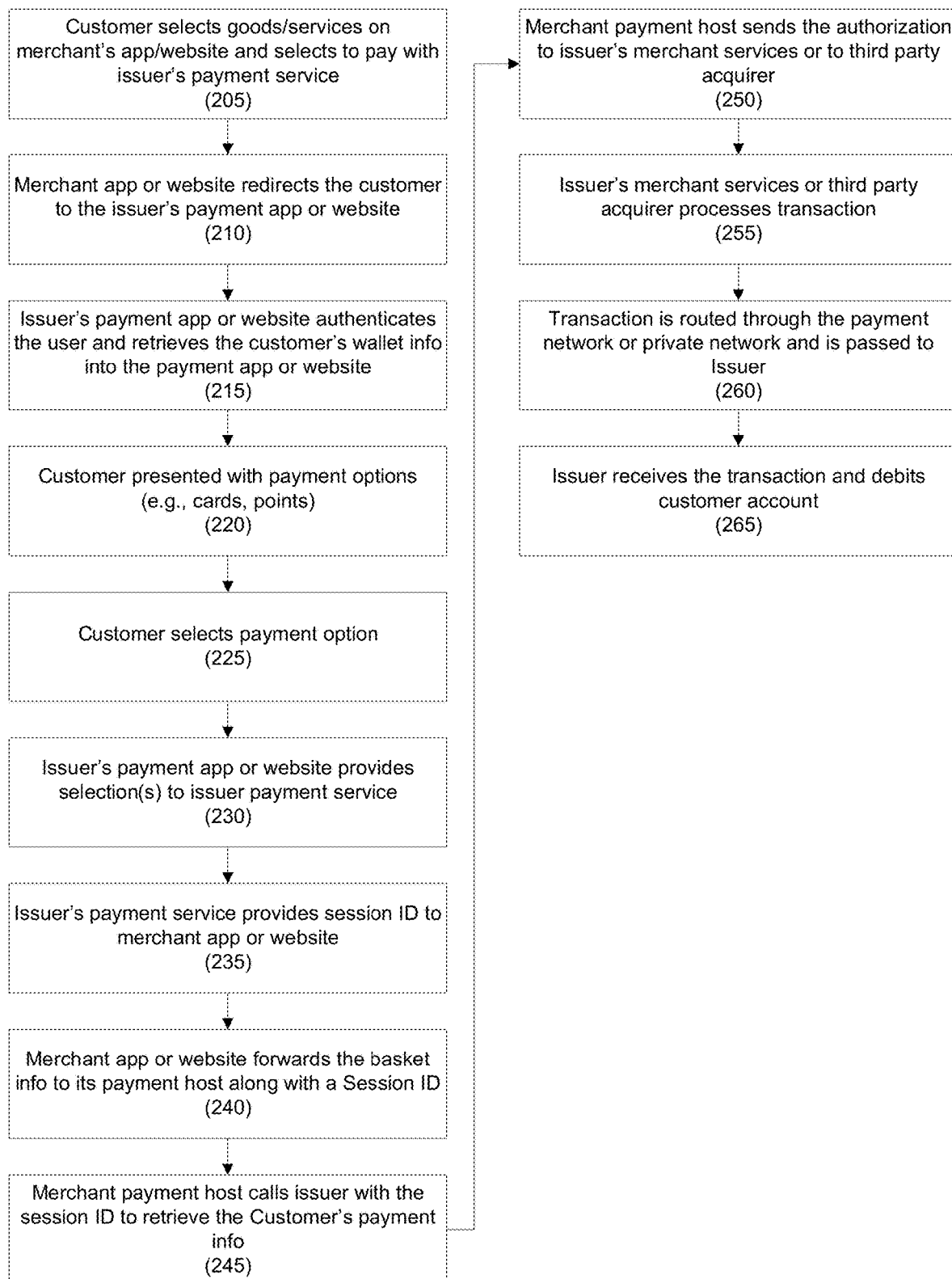
FIG. 2 illustrates a method for facilitating payment service-based guest checkout with a merchant according to one embodiment.

Referring to FIG. 2, a method for facilitating payment service-based guest checkout with a merchant are disclosed according to embodiments, respectively.

In step 205, a customer may shop at a merchant. In one embodiment, the customer may shop on-line at a merchant website using a browser, or may shop using a merchant app on a mobile electronic device or any other suitable electronic device.

After selecting a good or service to purchase, the customer may select the issuer's payment service for payment. In one embodiment, the customer may select a button or other interface that may be provided on the merchant's checkout page to select the issuer's payment service.

In step 210, the merchant website or app may redirect the customer to the issuer's payment app, or, if not available, to the issuer's website. In one embodiment, the merchant website or app may first attempt to redirect to the issuer's payment app; if the issuer's payment app is not installed or is otherwise not available, the merchant website or app may redirect to the issuer's website in a browser.

In step 215, the issuer's payment app may authenticate the customer and retrieves the customer's wallet info into the payment app from, for example, the issuer's payment service. If the issuer's website is used, the issuer's website may require the customer to log in to their account with the issuer, and the issuer's website may retrieve the customer's wallet from the issuer's payment service.

In step 220, the issuer's payment app or website may present the customer with payment options. For example, the customer may be presented with the customer's credit or debit cards issued by the issuer, lines of credit that may be available, reward points that may be used, etc.

In step 225, the customer may select one or more of the payment options available. If the customer selects multiple payment options, the customer may indicate how the transaction is to be split.

In step 230, once the selection(s) are made, the selection(s) are provided to the issuer payment service, which, in step 235, generates a session ID that is provided to the merchant's application or website. In one embodiment, the session ID may uniquely identify the session that the customer has with the issuer app or issuer website.

In step 240, the merchant app or the merchant website may provide transaction information (e.g., the order contents, items, amounts, and payment selection, etc.) to the merchant payment host, along with the session ID.

In step 245, the merchant payment host may call the issuer's digital payment services or similar service to retrieve the customer's payment information that was selected by the customer. In one embodiment, the merchant payment host may provide the session ID to the issuer's digital payment services, and the issuer's digital payment services may use the session ID to retrieve the payment method selected by the customer.

In step 250, the merchant payment host sends an authorization to the issuer's merchant services or to third party acquirer. For example, the authorization may be performed by any acquirer/merchant processor, gateway, etc. configuration that provides a path to the issuer's account holder systems. This may include a Merchant Services platform owned by the issuer, or any other third-party acquirer.

In step 255, the issuer's merchant services or the third-party acquirer may process the transaction.

In step 260, the transaction may be routed through a payment network (e.g., VisaNet), a private network (e.g., ChaseNet or similar), or any other network that is connected to the issuer's account holder systems.

In step 265, the issuer may receive the transaction and may debit or charge the customer's account. The issuer may then issue a statement indicating the merchant charge.

Although several embodiments have been disclosed, it should be recognized that these embodiments are not mutually exclusive and features from one may be used with others.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for facilitating payment service-based guest checkout with a merchant, comprising:
   receiving, at an issuer payment application or website executed by a computer processor and from a merchant application or website, a redirect of an online interaction between the merchant and a customer in a browser window for a browser, wherein the redirect causes the browser to access the issuer payment application or website;
   authenticating, by the issuer payment application or website, the customer via the issuer payment application or website;
   in response to the authentication, retrieving, by the issuer payment application or website and from an issuer payment service, wallet information comprising a plurality of payment options for the customer;
   receiving, by the issuer payment application or website, a selection of one of the payment options from the customer;
   communicating, by the issuer payment application or website, the selection of the payment option to the payment service for the issuer;
   associating, by the issuer payment service, a session identifier with the selected payment option;
   providing, by the issuer payment service, the session identifier to the merchant application or website;
   providing, by the merchant application or website, transaction information for a transaction and the session identifier to a merchant payment host; and
   retrieving, by the merchant payment host, the selected payment option from the issuer payment service using the session identifier and conducts the transaction using the selected payment option.

2. The method of claim 1, wherein the merchant application or website is executed by a customer electronic device.

3. The method of claim 1, wherein the payment options include at least one of a credit account, a debit account, and a reward point account.

4. The method of claim 1, wherein the session identifier identifies a session between the customer and the issuer payment application or website.

5. A method for facilitating payment service-based guest checkout with a merchant, comprising:
   receiving, by an issuer payment service comprising a computer processor and from an issuer application or website executed on a customer electronic device, a request for wallet information for a customer, the issuer application or website involved in an online interaction with the customer in a browser window for a browser that was redirected from a merchant application or website on the customer electronic device;
   authenticating, by the issuer payment service, the customer via an issuer payment application or website;
   in response to the authentication, retrieving, by the issuer payment service, the wallet information comprising a plurality of payment options for the customer;
   communicating, by the issuer payment service, the wallet information to the issuer application or website;

receiving, by the issuer payment service, a selection of one of the payment options from the issuer application or website;

communicating, by the issuer payment service, a session identifier to the merchant application or website;

associating, by the issuer payment service, the session identifier with the selected payment option;

receiving, by the issuer payment service and from a merchant payment host for the merchant, the session identifier and a request for the selected payment option;

retrieving, by the issuer payment service, the selected payment option associated with the session identifier;

communicating, by the issuer payment service, the selected payment option to the merchant payment host; and executing, by the merchant payment host, a transaction with the customer using the selected payment option.

6. The method of claim 5, wherein the merchant application or website is executed by the customer electronic device.

7. The method of claim 5, wherein the payment options include at least one of a credit account, a debit account, and a reward points account.

8. The method of claim 5, wherein the session identifier identifies a session between the customer and the issuer payment application or website.

9. A system for facilitating payment service-based guest checkout with a merchant, comprising:

an issuer information processing apparatus comprising at least one computer processor executing an issuer payment application or website and an issuer payment service; and a merchant information processing apparatus comprising at least one computer processor executing a merchant application or hosting a merchant website, and a merchant payment host;

wherein:

the merchant application or website on a customer electronic device receives an identification of a good or service to purchase in an online interaction with a customer in a browser window for a browser;

the merchant application or website receives a selection of a payment service associated with an issuer of a financial instrument;

the merchant application or website redirects the online interaction to the issuer payment application or website on the customer electronic device;

the issuer payment application or website authenticates the customer; in response to the authentication, the issuer payment application or website retrieves wallet information comprising a plurality of payment options for the customer, from the issuer payment service;

the issuer payment application or website receives a selection of one of the payment options from the customer and provides the selection to the issuer payment service;

the issuer payment service generates a session identifier and provides the session identifier to the merchant application or website;

the issuer payment service associates the session identifier with the selected payment option;

the merchant application or website provides transaction information for a transaction for the identified good or service and the session identifier to the merchant payment host;

the merchant payment host requests the selected payment option from the issuer payment service by providing the session identifier;

the issuer payment service retrieves the selected payment option associated with the session identifier;

the issuer payment service communicates the selected payment option to the merchant payment host; and the merchant payment host conducts the transaction using the selected payment option.

10. The system of claim 9, wherein the payment options include at least one of a credit account, a debit account, and a reward points account.

11. The system of claim 9, wherein the session identifier identifies a session between the customer and the issuer payment application or website.

* * * * *